No Printed Specification Available
4414X
E. HIDDEN.
Gun-Carriage.
Patented Apr 26, 1826.
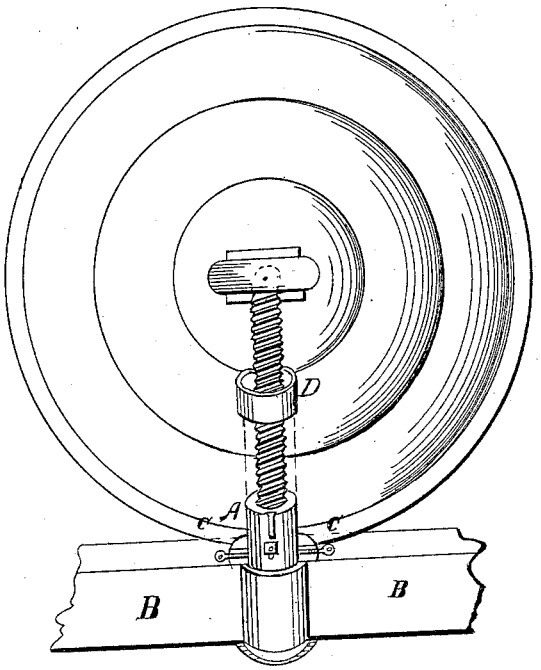
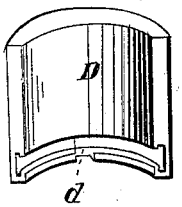
N. PETERS, PHOTO-LITHOGRAPHER, WASHINGTON, D. C.